US012703999B2

(12) United States Patent
Song et al.

(10) Patent No.: US 12,703,999 B2
(45) Date of Patent: Aug. 11, 2026

(54) DOOR LOCK

(71) Applicant: ILLINOIS TOOL WORKS INC., Glenview, IL (US)

(72) Inventors: Zhenpeng Song, Dongguan City (CN); Yang Wang, Dongguan City (CN)

(73) Assignee: ILLINOIS TOOL WORKS INC., Glenview, IL (US)

(*) Notice: Subject to any disclaimer, the term of this patent is extended or adjusted under 35 U.S.C. 154(b) by 17 days.

(21) Appl. No.: 18/644,924

(22) Filed: Apr. 24, 2024

(65) Prior Publication Data

US 2024/0360698 A1 Oct. 31, 2024

(30) Foreign Application Priority Data

Apr. 28, 2023 (CN) ......................... 202310480141.7
Apr. 3, 2024 (CN) ......................... 202410404193.0

(51) Int. Cl.
*E05C 19/02* (2006.01)
*E05B 63/00* (2006.01)
(Continued)

(52) U.S. Cl.
CPC .. *E05B 63/0017* (2013.01); *E05B 2015/0437* (2013.01)

(58) Field of Classification Search
CPC ............... E05B 63/0017; E05B 15/101; E05B 2015/0448; Y10S 292/04; Y10S 292/61; Y10S 292/69; Y10T 292/0814; Y10T 292/0818; Y10T 292/0921; Y10T 292/0926; Y10T 292/0969; E05C 19/026; E05C 1/08
See application file for complete search history.

(56) References Cited

U.S. PATENT DOCUMENTS 306,179 A * 10/1884 Roosevelt ........... E05B 47/0002 292/144
350,032 A * 9/1886 Bennett ................... E05B 63/20 27/DIG. 1

(Continued)

FOREIGN PATENT DOCUMENTS

CN 103 584 814 B 4/2016
CN 114855425 A * 8/2022 ............. D06F 37/42

(Continued)

OTHER PUBLICATIONS

EPO, Munich, Germany, EPO Communication (Form 1507N) and EPO Form 1503 03.82, extended European Search Report for European Application EP 25163954.8, Jul. 22, 2025 (10 pages).

*Primary Examiner* — Carlos Lugo
(74) *Attorney, Agent, or Firm* — Pauley Erickson & Swanson

(57) ABSTRACT

A door lock includes a housing, a locking unit, and a slider, wherein the locking unit is provided within the housing, the locking unit movable with respect to the housing so as to assume a locked position and a released position. The slider is connected to the locking unit is configured to be movable between a first position and a second position, wherein when the slider moves from the first position to the second position, the locking unit can move from the released position to the locked position. The door lock of the present disclosure provides a comfortable sense of control.

18 Claims, 14 Drawing Sheets

(51) Int. Cl.

| | |
|---|---|
| *E05B 15/04* | (2006.01) |
| *E05B 15/10* | (2006.01) |

(56) References Cited

U.S. PATENT DOCUMENTS

| | | | | | |
|---|---|---|---|---|---|
| 1,540,088 | A * | 6/1925 | Rasmussen | E05B 65/0092 292/99 |
| 2,502,607 | A * | 4/1950 | Vinton | E05B 65/0042 292/52 |
| 2,637,196 | A * | 5/1953 | Seaver | E05B 77/48 70/264 |
| 4,877,228 | A * | 10/1989 | Ripert | H01R 43/28 269/238 |
| 4,917,416 | A * | 4/1990 | Westphal | E05C 1/04 292/DIG. 47 |
| 5,419,305 | A * | 5/1995 | Hanley | F24C 15/022 292/113 |
| 5,915,766 | A * | 6/1999 | Baumeister | B04B 7/06 292/201 |
| 5,984,381 | A * | 11/1999 | Yamagishi | E05C 19/022 292/45 |
| 8,118,332 | B2 | 2/2012 | Morgan et al. | |
| 9,380,924 | B2 | 7/2016 | Dirnberger et al. | |
| 10,012,012 | B2 * | 7/2018 | Alexander | E05B 83/34 |
| 10,844,635 | B2 * | 11/2020 | Olson | E05B 47/0012 |
| 11,889,965 | B2 | 2/2024 | Dirnberger et al. | |
| 2025/0288181 | A1 | 9/2025 | Wang et al. | |

FOREIGN PATENT DOCUMENTS

| | | | | | |
|---|---|---|---|---|---|
| CN | 108309185 | B * | 8/2023 | A47L 15/00 |
| DE | 102015201944 | A1 * | 9/2015 | D06F 39/14 |
| FR | 2 860 260 | B1 | 3/2007 | |
| GB | 330711 | A * | 6/1930 | E05C 1/08 |
| KR | 20170137518 | A * | 12/2017 | E05B 15/101 |
| WO | WO-2019010061 | A1 * | 1/2019 | E05B 17/0062 |

* cited by examiner

DOOR LOCK

CROSS-REFERENCE TO RELATED APPLICATIONS

Chinese Patent Applications CN 2023104801417, filed on 28 Apr. 2023 and CN 2024104041930, filed on 3 Apr. 2024, the priority documents corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present disclosure relates to a door lock, and in particular to an appliance door lock for a household appliance.

Discussion of Related Art

Generally, a door lock is mounted to a door of an appliance such as a dishwasher. When the door is to be closed, a pushing force is applied to the door, and a latch is then inserted into the door lock to lock the door; and when the door is to be opened, a pulling force is applied to the door, and the latch is then withdrawn from the door lock. The door lock is required to lock the door of the dishwasher for safety of use when the dishwasher is in operation to prevent the dishwasher from being opened while the dishwasher is in operation.

SUMMARY OF THE INVENTION

The present disclosure provides a door lock, comprising: a housing, a locking unit, and a slider, wherein the locking unit is provided within the housing, the locking unit movable with respect to the housing so as to assume a locked position and a released position; and the slider is connected to the locking unit, and the slider is configured to be movable between a first position and a second position, wherein when the slider moves from the first position to the second position, the locking unit can move from the released position to the locked position.

According to the door lock as described above, the door lock further comprises a slider elastic device, the slider elastic device is configured to provide a spring force to the slider, and the direction in which the spring force acts on the slider is changeable during movement of the slider from the first position to the second position.

According to the door lock as described above, a first stroke and a second stroke are provided for the slider to move from the first position to the second position, wherein the spring force provides a resistance force to the slider in the first stroke, and the spring force provides an assistance force to the slide in the second stroke.

According to the door lock as described above, in the first stroke, a force component of the spring force acting on the slider in a movement direction of the slider is a first force component; and in the second stroke, a force component of the spring force acting on the slider in the movement direction of the slider is a second force component, the first force component and the second force component being in opposite directions.

According to the door lock as described above, the slider elastic device comprises a pair of elastic components, wherein the pair of elastic components are respectively connected to two sides of the slider, and each of the pair of elastic components has a first end connected to the housing, and a second end connected to the slider.

According to the door lock as described above, during the transition of the slider from the first stroke to the second stroke, a connecting line between a connection between each of the pair of clastic components and the housing and a connection between the pair of elastic components and the slider is substantially perpendicular to the movement direction of the slider.

According to the door lock as described above, the pair of elastic components are torsion springs or springs.

According to the door lock as described above, the locking unit comprises a pair of locking arms, each of the pair of locking arms comprises locking ends being movable toward or away from each other to allow the pair of locking arms to reach the locked position and the released position.

According to the door lock as described above, the pair of locking arms are capable of retaining a locked component between the pair of locking arms, and the locking ends of the pair of locking arms are configured to be able to prevent the locked component from being disengaged from the pair of locking arms.

According to the door lock as described above, the locking ends of the pair of locking arms comprise a pair of protrusions bent toward each other, when the pair of locking arms are in the locked position, the pair of protrusions are located on one side of the locked component in the movement direction of the slider so as to prevent the locked component from moving toward the locking ends in the movement direction of the slider.

According to the door lock as described above, the pair of locking arms each comprise a connecting end being rotatably or slidably connected to the slider; and the door lock further comprises locking arm return devices being respectively connected to the pair of locking arms and capable of applying spring forces to the pair of locking arms to maintain the pair of locking arms in the released position.

According to the door lock as described above, the housing has a pair of limiting portions, wherein the pair of locking arms each has a locking arm outer section, and when the slider moves from the first position to the second position, the locking arm outer sections of the pair of locking arms are pressed by the pair of limiting portions such that the pair of locking arms moves from the released position to the locked position.

According to the door lock as described above, the door lock further comprises a switch assembly transitioning from a first switch state to a second switch state when the slider reaches the second position.

According to the door lock as described above, the switch assembly has a trigger lever and a contact, the slider is capable of pushing the trigger lever to move so as to come into contact with or be separated from the contact, such that the switch assembly switches from one of the first switch state and the second switch state to the other switch state.

According to the door lock as described above, the switch assembly further comprises an elastic component provided between the trigger lever and the housing to apply a spring force to the trigger lever such that the trigger lever leaves the contact.

The present disclosure further provides a door lock, comprising: a housing, a locking unit, and a slider, wherein the locking unit is provided within the housing, the locking unit movable with respect to the housing so as to assume a locked position and a released position; the slider is connected to the locking unit, and the slider is configured to be movable between a first position and a second position, wherein when the slider moves from the first position to the second position, the locking unit can move from the released position to the locked position; and a slider locking device being configured to retain the slider in the second position and to retain the locking unit in the locked position.

According to the door lock as described above, the slider locking device is capable of being engaged to and disengaged from the slider, when the slider locking device is engaged to the slider, the slider is maintained in the second position and the locking unit is maintained in the locked position, and when the slider locking device is disengaged from the slider, the slider moves out of the second position, and thus the locking unit moves out of the locked position.

According to the door lock as described above, the door lock further comprises a slider return device, the slider return device being configured to provide a spring force to the slider such that the slider is capable of moving from the second position to the first position.

According to the door lock as described above, the slider locking device further comprises a driving device being capable of driving the slider locking device away from the slider, such that the slider is capable of moving from the second position to the first position.

According to the door lock as described above, the slider locking device further comprises a contact portion being capable of moving to engage with the slider or disengage from the slider and a contact portion elastic device being configured to provide a spring force to the contact portion such that the contact portion is capable of moving toward the slider; and one of the contact portion and the slider comprises a protrusion, and the other of the contact portion and the slider comprises a recess, wherein when the slider locking device is engaged to the slider, the protrusion enters the recess, and when the slider locking device is disengaged from the slider, the protrusion exits the recess.

The present disclosure provides a door lock assembly, comprising: the door lock as described above; and a latch comprising a protrusion being capable of entering between the pair of locking arms and being able to be locked by the pair of locking arms to limit a movement of the latch with respect to the door lock.

The present disclosure provides an appliance, the appliance comprising the door lock assembly as described above.

The door lock of the present disclosure allows for the locking and unlocking of a locked part. The door lock of the present disclosure comprises a slider, locking arms, and a slider elastic device, which can improve the perception of control during door opening and closing. The locking arms of the present disclosure has reduced requirements on the strength of materials. The present disclosure can adapt to latches of different shapes.

DESCRIPTION OF PREFERRED EMBODIMENTS

Figure 1A:
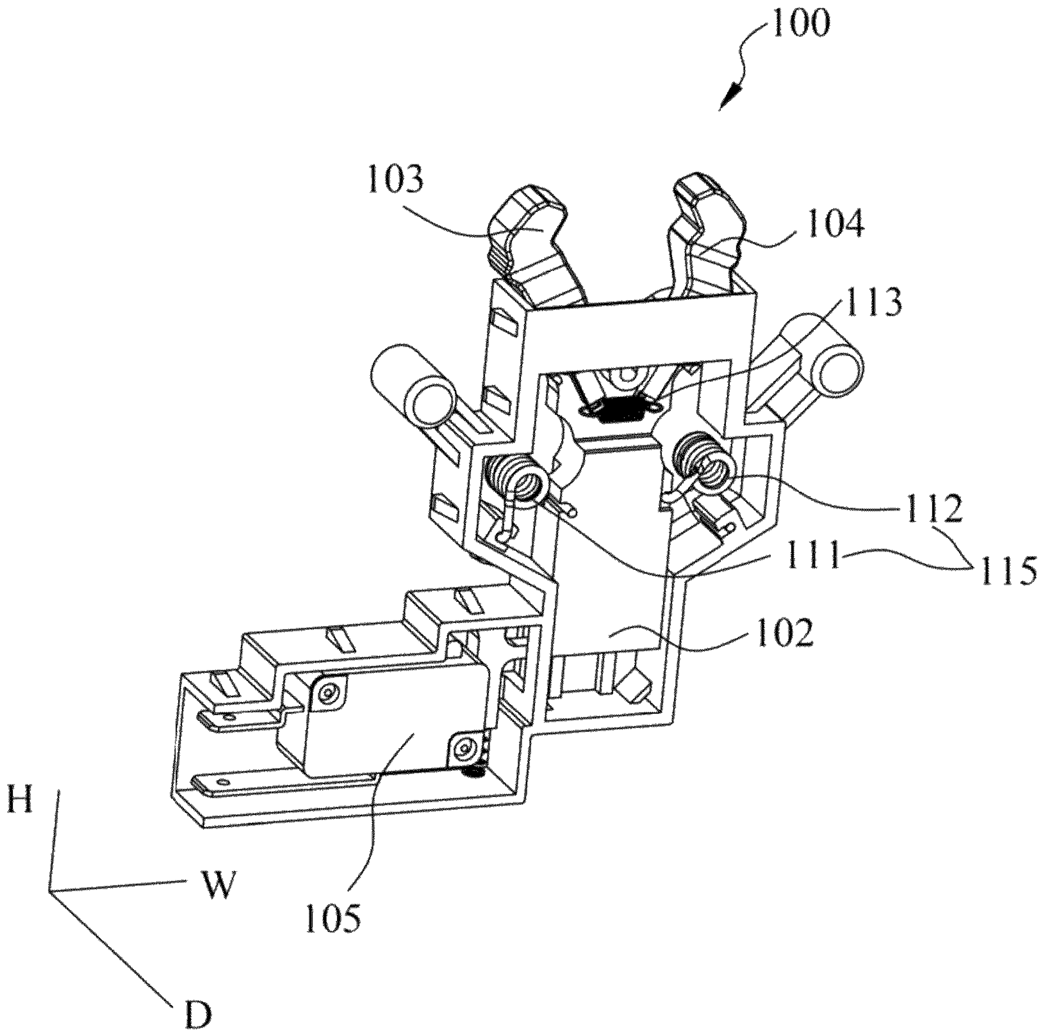
FIG. 1A is a perspective view of a door lock according to a first embodiment of the present disclosure.

Various specific embodiments of the present disclosure are described below with reference to the accompanying drawings which constitute part of this description. It should be understood that although the terms such as “front”, “rear”, “upper”, “lower”, “left”, and “right” indicating directions are used in the present disclosure to describe various exemplary structural parts and elements of the present disclosure, these terms used herein are merely used for case of description and are determined based on the exemplary orientation shown in the accompanying drawings. Since the arrangements in the embodiments disclosed in the present disclosure may be in various directions, these terms indicating directions are merely illustrative and should not be considered as limitations. If possible, the same or similar reference numerals used in the present disclosure refer to the same components.

Figure 1B:
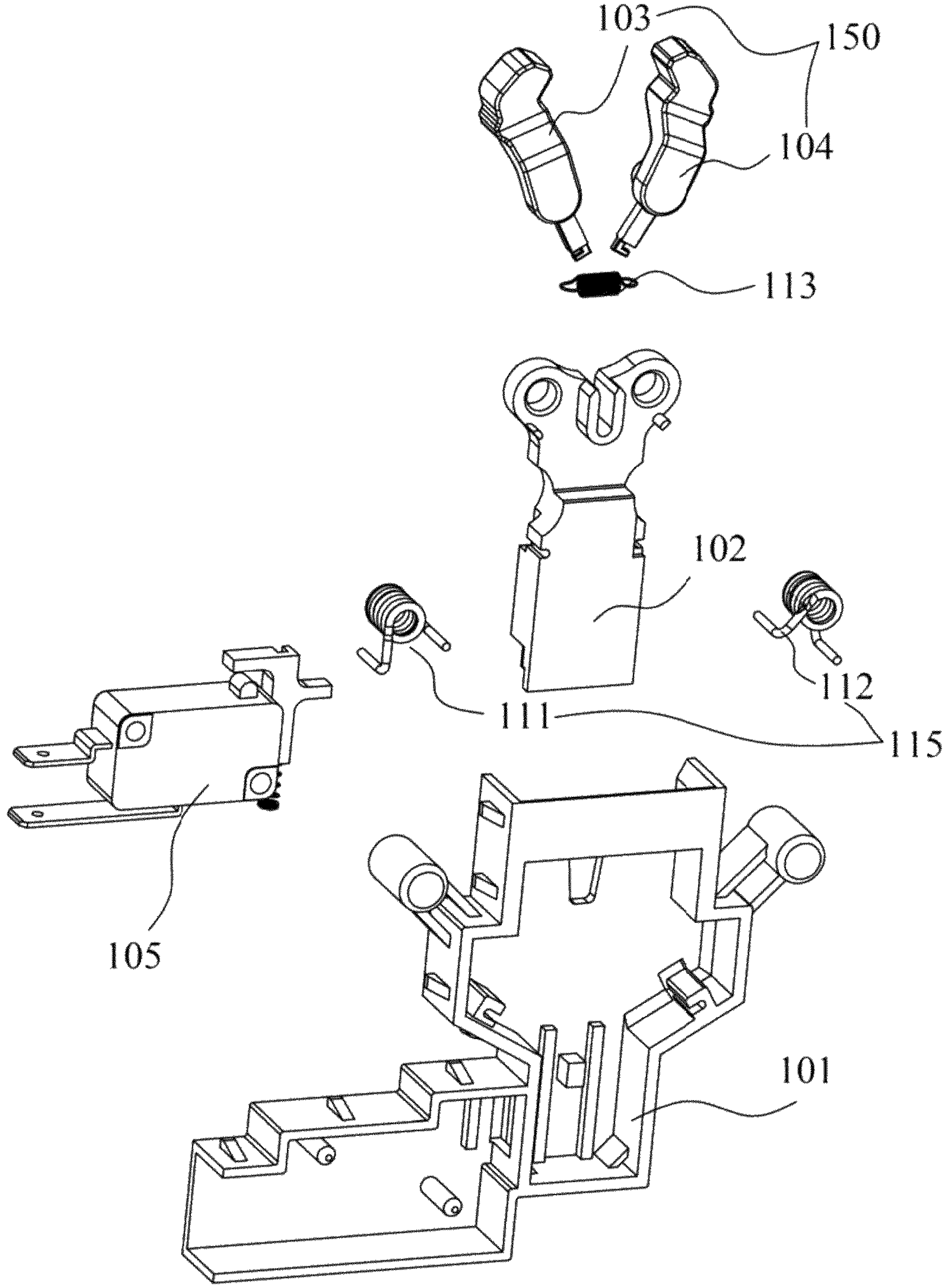
FIG. 1B is an exploded view of the door lock of FIG. 1A.

FIG. 1A is a perspective view of a door lock of the present disclosure, and FIG. 1B is an exploded view of the door lock of FIG. 1A. FIGS. 1A and 1B show a structure of the door lock. In an application, the door lock is mounted to a cabinet of a household appliance, a latch is mounted to a door of the household appliance, and the latch is a locking component. The door lock can fit to the latch to lock or release the latch, so as to lock and release the door. As shown in FIG. 1A and FIG. 1B, the door lock 100 has a height direction H, a width direction W, and a thickness direction D. The door lock 100 comprises a housing 101, a slider 102, a locking unit 150, a switch assembly 105, a slider elastic device 115, and a locking arm return device 113. The locking unit 150 comprises a pair of locking arms 103 and 104. Each of the slider 102, the switch assembly 105, the slider elastic device 115 and the locking arm return device 113 is accommodated inside the housing 101.

The slider 102 is movable with respect to the housing 101. One end of each of the pair of locking arms 103 and 104 is connected to the slider 102, and the other ends thereof can move closer to or away from each other as driven by the slider 102, so as to lock or release the latch. The slider elastic device 115 is arranged between the pair of locking arms 103 and 104 to provide to slider elastic device 115 a spring force to allow the locking arms to move away from each other. The slider elastic device 115 comprises a pair of elastic components, which are a first torsion spring 111 and a second torsion spring 112 in an embodiment of the present disclosure. The first torsion spring 111 and the second torsion spring 112 are arranged on either side of the slider 102, and each of the first torsion spring 111 and the second torsion spring 112 connects the slider 102 to the housing 101, so as to provide a spring force between the housing 101 and the slider 102. The spring force provided by the slider elastic device 115 changes during a movement of the slider 102. The switch assembly 105 is arranged at one side of the slider 102, and the switch assembly 105 can be triggered during the movement of the slider 102.

In another embodiment of the present disclosure, the elastic components are springs.

Figure 2A:
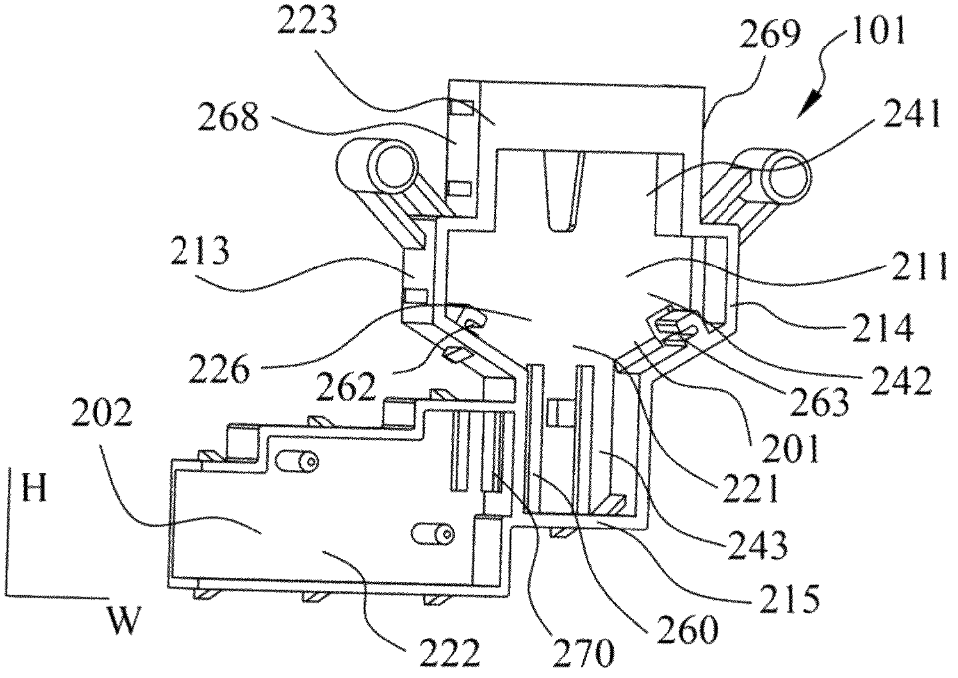
FIG. 2A is a perspective view of a housing of FIG. 1B.
Figure 2B:
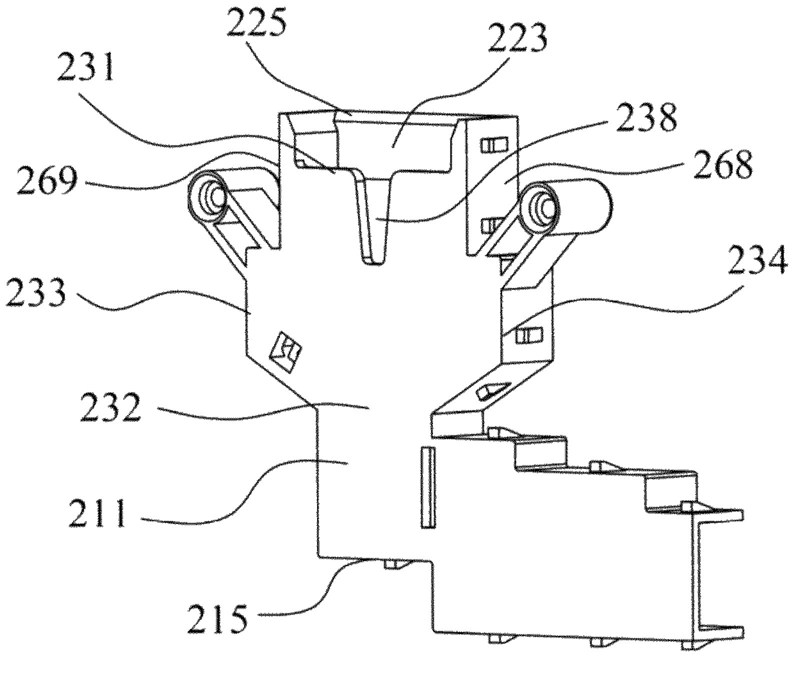
FIG. 2B is a perspective view of the housing of FIG. 2A from another perspective.

FIG. 2A is a perspective view of the housing of FIG. 1B, and FIG. 2B is a perspective view of the housing of FIG. 2A from another perspective, illustrating the other side of the housing.

As shown in FIGS. 2A and 2B, the housing 101 comprises a body accommodation portion 201 and a switch accommodation portion 202. The body accommodation portion 201 has a bottom plate 211, a pair of lateral housing portions 213 and 214, and a rear portion 215. The bottom plate 211 is substantially a flat plate and has a first side 231 and a second side 232 arranged opposite each other in the width direction of the door lock 100, and a third side 233 and a fourth side 234 arranged opposite each other in the height direction of the door lock 100. The pair of lateral housing portions 213 and 214 extend respectively from edges of the third side 233 and the fourth side 234 in a direction substantially perpendicular to the bottom plate 211. The rear portion 215 extends from an edge of the second side 232 in the direction substantially perpendicular to the bottom plate 211, and the rear portion 215 is connected to one end of each of the lateral housing portions 213 and 214. The body accommodation portion 201 further comprises a cross beam 223, wherein the cross beam 223 extends substantially parallel to the bottom plate 211, and two ends of the cross beam 223 are connected to the other end of each of the pair of lateral housing portions 213 and 214. The bottom plate 211, the lateral housing portion 213, the rear portion 215, the lateral housing portion 214, and the cross beam 223 define a body accommodation cavity 221. The body accommodation cavity 221 has a front opening 225 and a top opening 226. The front opening 225 is defined by the bottom plate 211, the lateral housing portion 213, the cross beam 223, and the lateral housing portion 214. The top opening is defined by the bottom plate 211, the lateral housing portion 213, the rear portion 215 and the lateral housing portion 214. The locking arms 103 and 104 are movable in the front opening 225. The top opening 226 facilitates the mounting and maintenance of components. Sections of the lateral housing portions 213 and 214 close to the front opening 225 form limiting portions 268 and 269.

The bottom plate 211 has a notch 238 on a first side 231, wherein the notch 238 is shaped to match the shape of the latch to facilitate entry of the latch. The body accommodation cavity 221 comprises a front section 241, a middle section 242, and a rear section 243 that are arranged in the height direction of the door lock 100. In the width direction, the width of the middle section 242 is greater than the width of the front section 241, and the width of the front section 241 is greater than the width of the rear section 243. The bottom plate 211 is provided with guide ribs 260 extending in the height direction of the door lock 100 for mating with the slider 102 to guide the slider to move in the height direction H. The guide ribs 260 are arranged on the rear section of the body accommodation cavity 221. The lateral housing portion 213 is provided with slider elastic device mounting portions 262 and 263, wherein the slider clastic device mounting portions 262 and 263 have grooves for mounting the first torsion spring 111 and the second torsion spring 112.

The switch accommodation portion 202 is arranged on one side of the switch accommodation portion 201 and is connected to the lateral housing portion 213. The lateral housing portion 213 is provided with an opening 270. The switch accommodation portion 202 has a switch accommodation cavity 222, wherein the switch accommodation cavity 222 is in communication with the body accommodation cavity 221 via the opening 270. The switch accommodation portion 202 is configured for accommodating the switch assembly 105.

Figure 3A:
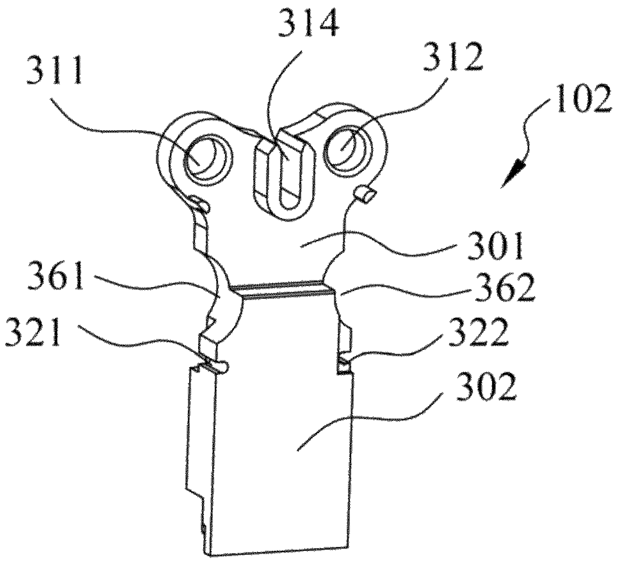
FIG. 3A is a perspective view of a slider of FIG. 1B.
Figure 3B:
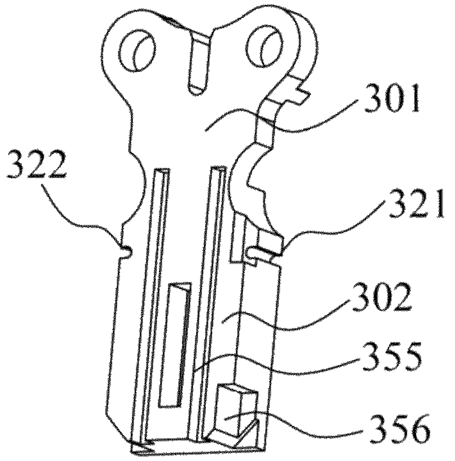
FIG. 3B is a perspective view of the slider of FIG. 3A from another perspective.

FIG. 3A is a perspective view of the slider of FIG. 1B, and FIG. 3B is a perspective view of the slider of FIG. 3A from another perspective. As shown in FIGS. 3A and 3B, the slider 102 comprises a head 301 and a body 302, wherein the head 301 comprises a pair of shaft mounting holes 311 and 312 for receiving corresponding parts of the locking arms 103 and 104. The head 301 further has a groove 314 for receiving a corresponding part of the latch. The body 302 has a pair of torsion spring mounting portions 321 and 322 on each side of the body 302 for mounting a first torsion spring 111 and a second torsion spring 112. The torsion spring mounting portions 321 and 322 are grooves formed by recessing inwardly from an outer surface of the body 302. A side of the body 302 facing the bottom plate 211 of the housing 101 has strip-shaped guide slots 355, and the guide slots 355 can fit with the guide ribs 260 of the housing 101 to limit the movement direction of the slider 102. A side of the slider 102 facing the switch accommodation portion 202 has a recess 356, and the recess 356 can fit with the switch assembly.

The slider 102 further comprises a pair of recesses 361 and 362 that are recessed towards each other. The recesses 361 and 362 are substantially arc-shaped and configured for accommodating the first torsion spring 111 and the second torsion spring 112. The recesses 361 and 362 are located at a junction between the head 301 and the body 302.

Figure 4A:
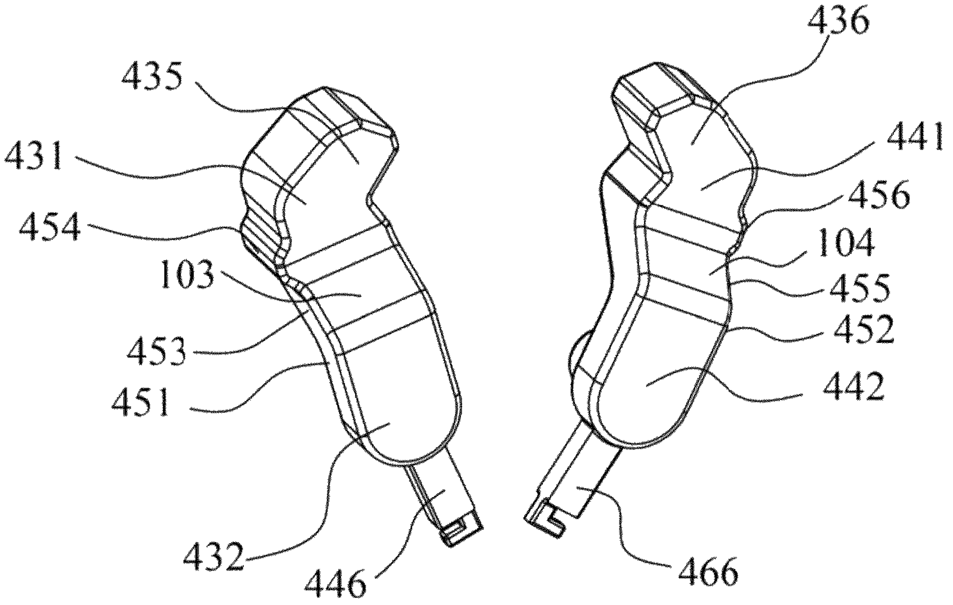
FIG. 4A is a perspective view of a pair of locking arms of FIG. 1B.
Figure 4B:
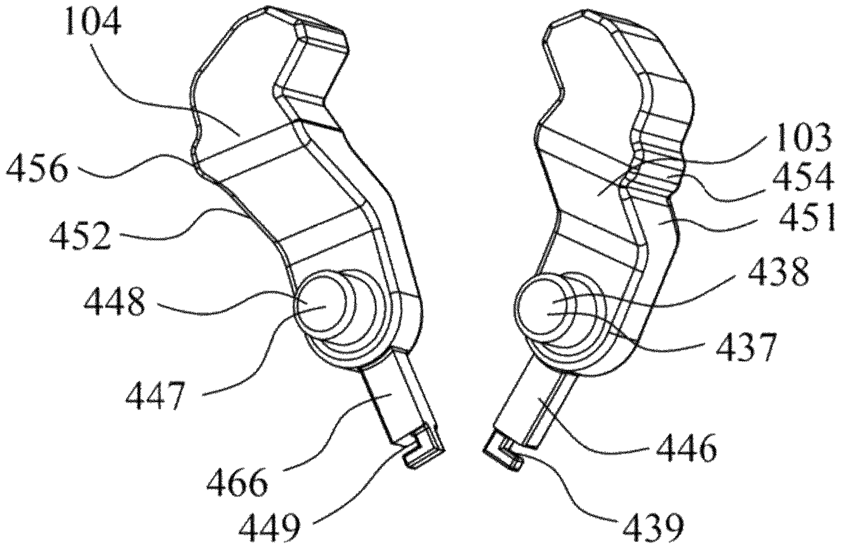
FIG. 4B is a perspective view of the pair of locking arms of FIG. 4A from another perspective.

FIG. 4A is a perspective view of a pair of locking arms of FIG. 1B, and FIG. 4B is a perspective view of the pair of locking arms of FIG. 4A from another perspective. As shown in FIG. 4A and FIG. 4B, the locking arms 103 and 104 are structurally similar and symmetrically arranged. The locking arm 103 has a locking end 431 and a connecting end 432. The end portion of the locking end 431 has a protrusion 435 bent toward the locking arm 104. The projection 435 is formed to have a hook-like shape. The connecting end 432 has an elastic device connecting portion 446 and a housing connecting portion 437. The clastic device connecting portion 446 comprises a slot 439 for connecting to one end of the slider elastic device. The housing connecting portion 437 comprises a bump 438 protruding from a surface of the locking arm 103 towards the bottom plate 211. The bump 438 is substantially cylindrical, and can enter the shaft mounting hole 311 of the slider 102 to rotate in the shaft mounting hole 311. That is to say, the bump 438 forms a shaft such that the locking arm 103 can rotate with respect to the slider 102. The locking arm 103 has a locking arm outer section 451, wherein the locking arm outer section 451 can come into contact with the limiting portion 268 of the lateral housing portion 213 of the housing 101. The locking arm outer section 451 comprises a smooth section 453 and a protruding section 454.

The locking arm 104 and the locking arm 103 are symmetrically arranged, and similarly, the locking arm 104 has a locking end 441 and a connecting end 442. The end portion of the locking end 441 has a protrusion 436 bent toward the locking arm 104. The projection 436 is formed to have a hook-like shape. The connecting end 442 has an elastic device connecting portion 466 and a housing connecting portion 447. The elastic device connecting portion 466 comprises a slot 449 for connecting to one end of the slider elastic device. The housing connecting portion 447 comprises a bump 448 protruding from a surface of the locking arm 103 towards the bottom plate 211. The bump 448 is substantially cylindrical, and can enter the shaft mounting hole 312 of the slider 102 to rotate in the shaft mounting hole 312. That is to say, the bump 448 forms a shaft such that the locking arm 103 can rotate with respect to the slider 102. The locking arm 104 has a locking arm outer section 452, wherein the locking arm outer section 452 can come into contact with the limiting portion 269 of the lateral housing portion 214 of the housing 101. The locking arm outer section 452 comprises a smooth section 455 and a protruding section 456.

In the present disclosure, there is a spacing between the elastic device connecting portions 446 and 466 and the housing connecting portions 437 and 447 respectively, and the locking arm return device 113 is mounted between the elastic device connecting portions 446 and 466, so that the spring force can be applied between the locking arms 103 and 104, and the respective locking ends 431 and 441 of the locking arms 103 and 104 have a tendency to move away from each other.

In an embodiment of the present disclosure, in the height direction of the door lock 100, the housing connecting portions 437 and 447 are respectively located between the locking ends 431 and 441 and the clastic device connecting portions 446 and 466, and the locking arm return device 113 applies a pulling force to the elastic device connecting portions 446 and 466, so that the locking ends 431 and 441 have a tendency to move away from each other.

In another embodiment of the present disclosure, in the height direction of the door lock 100, the elastic device connecting portions 446 and 466 are located between the locking ends 431 and 441 and the housing connecting portions 437 and 447 respectively, and the locking arm return device 113 applies a pushing force to the elastic device connecting portions 446 and 466 so that the locking ends 431 and 441 have a tendency to move away from each other.

In another embodiment of the present disclosure, the locking arm 104 and the locking arm 103 are slidably connected to the slider 102. A protrusion is provided on one of each of the locking arms and the slider, and a sliding groove is provided on the other thereof, such that the locking arm can slide with respect to the slider.

Figure 5:
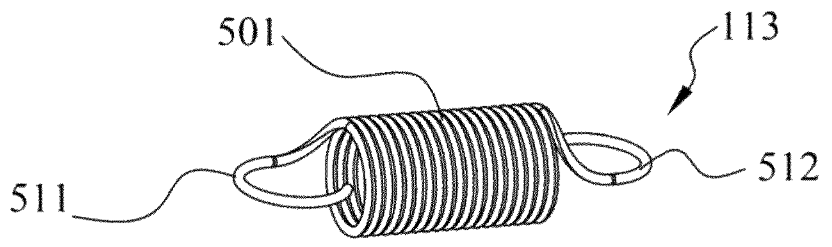
FIG. 5 is a perspective view of a locking arm return device of FIG. 1B.

FIG. 5 is a perspective view of the locking arm return device of FIG. 1B. As shown in FIG. 5, the locking arm return device 113 is a spring 501, one of hooks 511 and 512 is provided at each of two ends of the spring 501, and the hooks 511 and 512 can be respectively connected to the slots 439 and 449 of the locking arms 103 and 104, so that a pulling force can be applied to the elastic device connecting portions 446 and 466.

Figure 6:
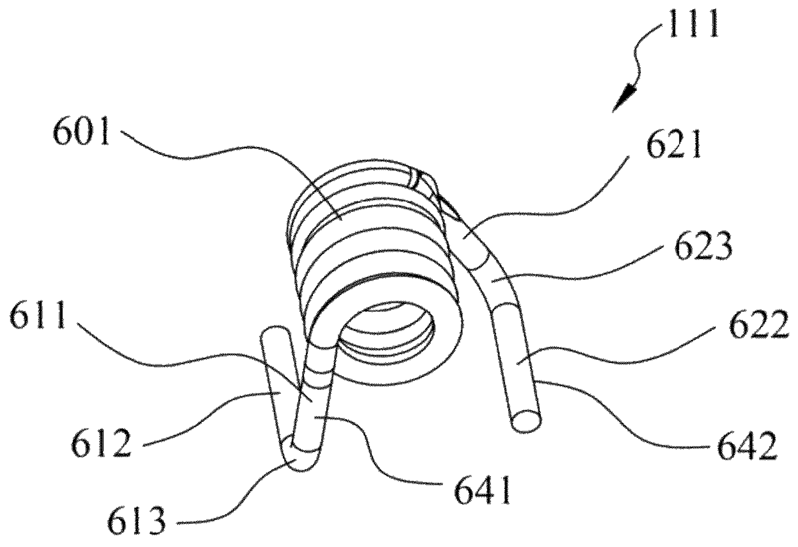
FIG. 6 is a perspective view of a first tension spring of FIG. 1B.

FIG. 6 is a perspective view of the first torsion spring of FIG. 1B, illustrating a structure of the first torsion spring. As shown in FIG. 6, the first torsion spring 111 comprises a body 601 and connecting portions 641 and 642 extending from the body. The connecting portion 641 comprises an elastic arm 611 and an extension 612, wherein the extension 612 is connected to an end portion 613 of the elastic arm 611 and extends substantially perpendicular to the elastic arm 611. Similarly, the connecting portion 642 comprises an elastic arm 621 and an extension 622, wherein the extension 622 is connected to an end portion 623 of the elastic arm 621 and extends substantially perpendicular to the elastic arm 621. An included angle is formed between the elastic arms 611 and 621, and a spring force is provided between the connecting portions 641 and 642.

Figure 7:
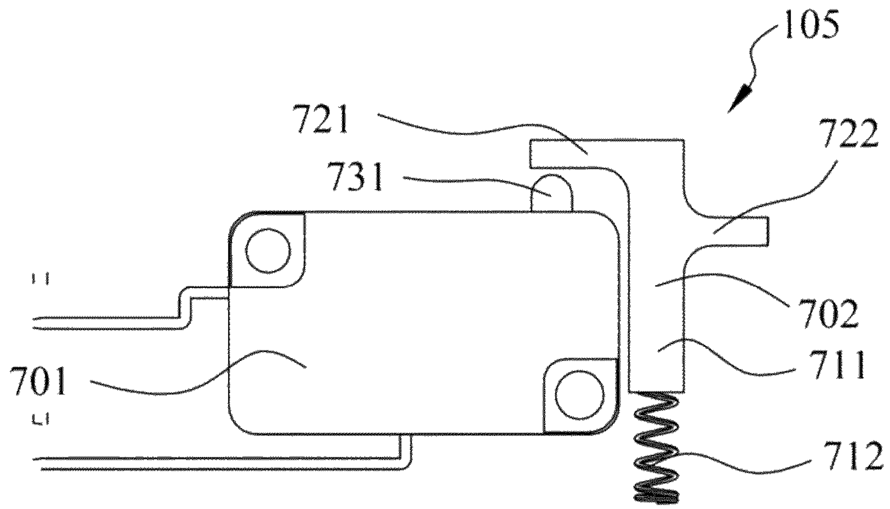
FIG. 7 is a perspective view of a switch assembly of FIG. 1B.

FIG. 7 is a perspective view of the switch assembly of FIG. 1B, illustrating a structure of the switch assembly. As shown in FIG. 7, the switch assembly 105 comprises a fixed portion 701 and a movable portion 702. The fixed portion 701 has a contact 731. The movable portion 702 has a movable portion 711 and a spring 712. The movable portion 711 has a contact portion 721 that can come into contact with the contact 731, and a trigger lever 722 that can come into contact with the slider 102. The spring 712 can apply a spring force to the movable portion 711 such that the contact portion 721 of the movable portion 711 can move in a direction away from the contact 731.

Figure 8:
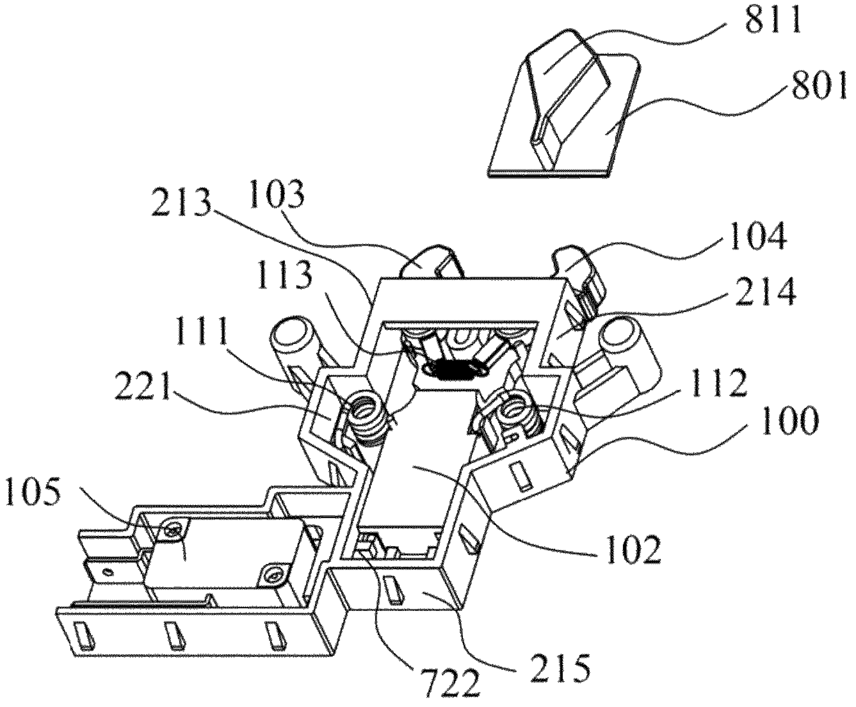
FIG. 8 is a perspective view of a door lock and a latch of the present disclosure.

FIG. 8 is a perspective view of the door lock and the latch of the present disclosure, illustrating a mating relationship between the door lock and the latch. As shown in FIG. 8, the latch 801 comprises a protrusion 811, and the protrusion 811 can enter between the pair of locking arms 103 and 104 and thus be locked. In an embodiment of the present disclosure, the door lock 100 is mounted to a body of an appliance, and the latch 801 is connected to the door. An operator can open and close the door to allow the latch 801 to be locked or released by the door lock 100. In an embodiment of the present disclosure, the protrusion 811 is rhombic. In other embodiments of the present disclosure, the protrusion 811 has a different shape, such as triangular, trapezoidal, etc.

As shown in FIG. 8, the slider 102 is provided within the body accommodation cavity 221 of the housing 101. The slider 102 can slide with respect to the housing 101 in the height direction H, i.e., the first direction, of the door lock 100. Two sides of the slider 102 are connected to the housing 101 by means of the first torsion spring 111 and the second torsion spring 112 respectively. The first torsion spring 111 and the second torsion spring 112 apply the spring forces to the slider 102, with the directions of the spring forces being generally the direction of a connecting line between the end portion 613 of the elastic arm 611 and the end portion 623 of the clastic arm 621. The locking arms 103 and 104 are rotatably connected to the slider 102 by means of the fit between the bumps 438 and 448 and the shaft mounting holes 311 and 312. The locking arms 103 and 104 are rotatable with respect to slider 102 about the bumps 438 and 448 respectively. In the height direction of the door lock 100, the locking arm return device 113 is arranged on sides of the bumps 438 and 448 away from the locking ends 431 and 441. The locking arm return device 113 applies a pulling force between the locking arms 103 and 104 such that the locking ends 431 and 441 have a tendency to move away from each other. The locking ends 431 and 441 are blocked by the limiting portions 268 and 269 of the housing 101 and thus cannot move further away from each other. The spring 712 of the switch assembly 105 applies a spring force to the movable portion 711, such that a trigger portion of the movable portion 711 has a tendency to move away from the contact 731. The trigger lever 722 passes through the opening 270 to be connected to the body accommodation cavity 221. The trigger lever 722 can enter the recess 356 of the slider 102. When the slider 102 moves towards the rear portion 215 of the housing in the height direction of the door lock, the slider 102 can come into contact with the trigger lever 722 to drive the trigger lever 711 to move by overcoming the spring force of the spring 712, such that the contact portion 721 can come into contact with the contact 731 to trigger a switch and close the circuit.

In the present disclosure, the locking arms 103 and 104 have the locked position and the released position with respect to each other. In the locked position, the latch 801 is clamped between the locking arms 103 and 104 and thus cannot be disengaged from the latch 801. In the released position, the latch 801 can disengage from the door lock. The slider 102 has a first position in which the slider 102 is located at the farthest position with respect to the rear portion 215 of the housing 101, and a second position in which the slider 102 is located at the furthest position with respect to the rear portion 215 of the housing 101. The movement of the slider 102 from the first position to the second position can drive the locking arms 103 and 104 to move from the released position to the locked position. The released position and the locked position of the locking arms 103 and 104 may not correspond to the first position and the second position of the slider 102. When the locking arms 103 and 104 are in the released position or the locked position, the slider 102 may be located at a position between the first position and the second position.

In an embodiment of the present disclosure, the slider 102 has a third position and a fourth position between the first position and the second position. When the slider 102 moves from the first position to the third position, the locking arms 103 and 104 are in the released position; when the slider 102 moves from the third position to the fourth position, the locking arms 103 and 104 move from the released position to the locked position; and when the slider 102 moves from the fourth position to the second position, the locking arms 103 and 104 remain in the locked position. That is to say, the released position and the locked position of the locking arms 103 and 103 are positions of the locking arms 103 and 103 with respect to each other, and the first position of the slider 102 is a position of the slider 102 with respect to the housing 101. Changes between the released position and the locked position of the locking arms 103 and 103 can occur asynchronously with changes between the first position and the second position of the slider 102.

Figure 9A:
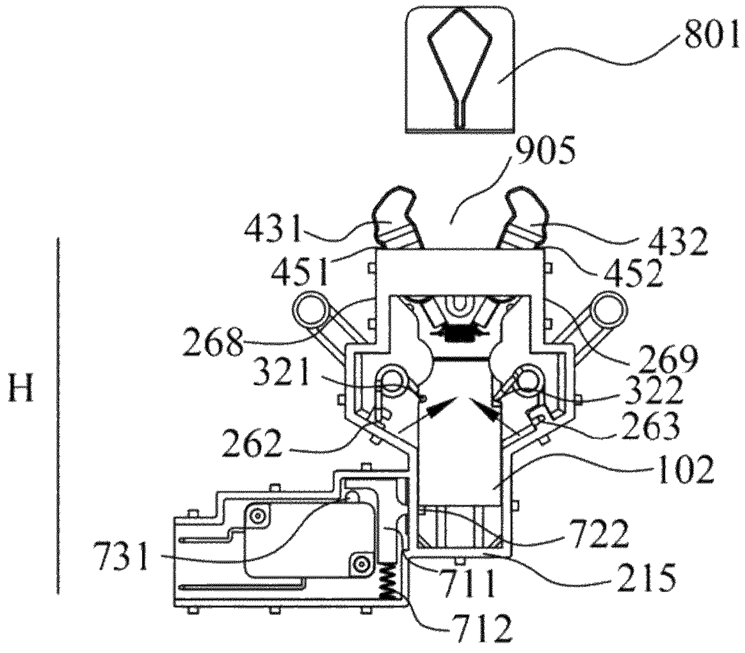
FIG. 9A is a schematic view of the door lock and the latch of FIG. 1A, which are separated from each other.
Figure 9B:
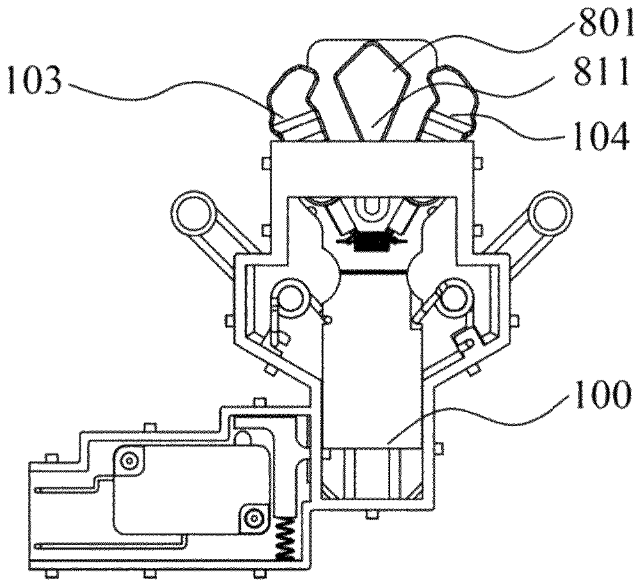
FIG. 9B is a schematic view of the latch that begins to enter the door lock.
Figure 9C:
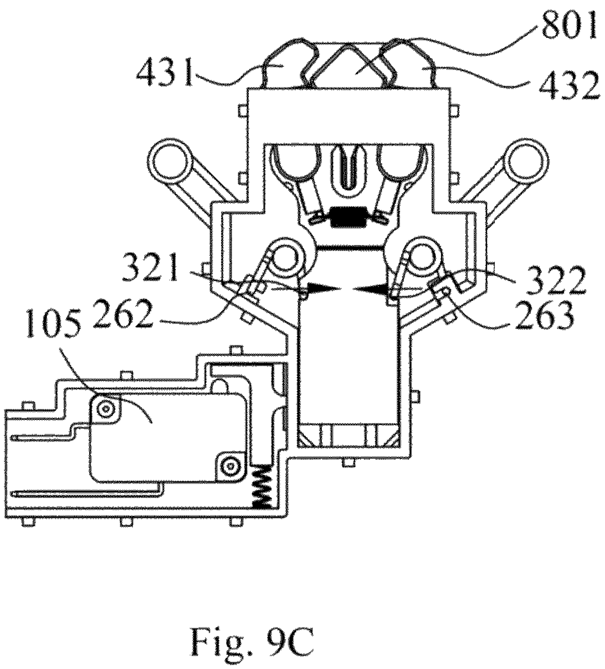
FIG. 9C is a schematic view of the latch entering the door lock.
Figure 9D:
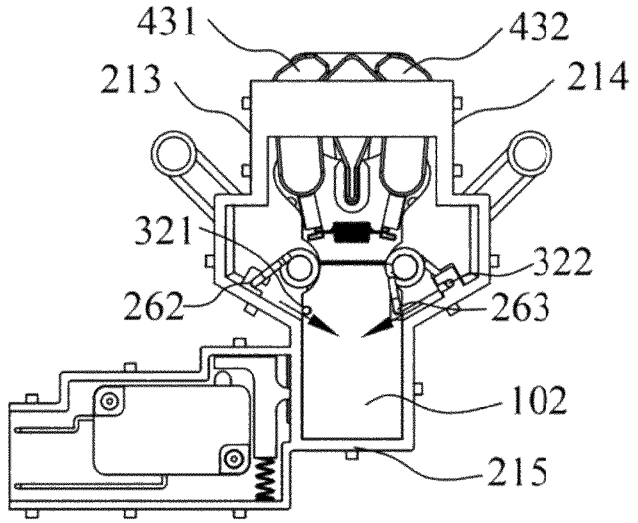
FIG. 9D is a schematic view of the latch in a locked state with respect to the door lock.

FIG. 9A is a schematic view of the door lock and the latch of FIG. 1A, which are separated from each other, FIG. 9B is a schematic view of the latch that begins to enter the door lock, FIG. 9C is a schematic view of the latch entering the door lock, and FIG. 9D is a schematic view of the latch in a locked state with respect to the door lock.

As shown in FIG. 9A, when a door of the appliance is opened, the door and the body of the appliance are in a separated state. In this case, the latch 801 disengages from the door lock 100, the locking arms 103 and 104 of the door lock 100 are in the released position, and the slider 102 is in the first position. In the width direction W of the door lock, the locking end 431 of the locking arm 103 and the locking end 441 of the locking arm 104 are located farthest from each other. In the height direction H of the door lock 100, the slider 102 is located at the farthest position with respect to the rear portion 215 of the housing 101. The locking arms 103 and 104 are inclined away from each other in a direction of the rear portion 215 and the front opening 225. The locking ends 431 and 441 of the locking arms 103 and 104 extend from the front opening 225 of the housing 101 to be located outside the housing 101. Under the action of the spring force from the locking arm return device 113, the locking arms 103 and 104 remain in an open state with respect to each other, and the smooth section 453 of the locking arm outer section 451 and the smooth section 455 of the locking arm outer section 452 respectively abut against the limiting portions 268 and 269 of the housing 101. The smooth sections 453 and 455 are inclined from bottom to top in directions away from each other. An opening 905 is formed between the locking ends 431 and 441.

As shown in FIG. 9A, the torsion spring mounting portions 321 and 322 of the slider 102 are at a higher height in the height direction of the door lock than the positions of the slider elastic device mounting portions 262 and 263 of the housing 101. In this case, a connecting line between the connection between each of the first torsion spring 111 and the second torsion spring 112 and the housing 101 and the connection between each of the first torsion spring 111 and the second torsion spring 112 and the slider 102 is inclined upwardly. The first torsion spring 111 and the second torsion spring 112 apply obliquely upward spring forces that are toward each other as indicated by arrows to the slider 102. That is to say, the spring forces have upward force components in the height direction of the door lock, allowing the slider 102 to have a tendency to move upwardly with respect to the housing 101, such that the slider 102 is maintained in the farthest position with respect to the rear portion 215 of the housing 101, that is, the first position of the slider 102. The slider 102 and the housing 101 are limited to the furthest position of the slider 102 and the housing 101 with respect to the housing 101 by the cooperation of the guide ribs 260 and the guide grooves 355, such that the slider 102 cannot be disengaged from the housing 101.

In the direction shown in FIG. 9A, the spring 712 of the switch assembly 105 applies the spring force to the movable portion 711, such that the movable portion 711 goes upwardly to the furthest position, in this case, there is a spacing between the contact portion 721 and the contact 731 and the switch assembly 105 is in an OFF state. There is a spacing between the trigger lever 722 and the slider 102.

FIG. 9B shows that the latch 801 enters the opening 905 formed between the locking ends 431 and 441. In this case, the locking arms 103 and 104 remain in the released position, and the protrusion 811 of the latch 801 is not yet in contact with the locking arms 103 and 104. The latch 801 is in contact with the slider 102.

FIG. 9C shows that the latch 801 further enters between the locking ends 431 and 441. In this case, the slider 102 is about to enter a second stroke from a first stroke.

In the position as shown in FIG. 9C, the torsion spring mounting portions 321 and 322 of the slider 102 are at a height in the height direction of the door lock substantially equal to the positions of the slider elastic device mounting portions 262 and 263 of the housing 101. In this case, the connecting line between the connection between each of the first torsion spring 111 and the second torsion spring 112 and the housing 101 and the connection between each of the first torsion spring 111 and the second torsion spring 112 and the slider 102 is substantially perpendicular to the movement direction of the slider, that is, substantially in a horizontal direction as shown in FIG. 9C. In this case, the first torsion spring 111 and the second torsion spring 112 apply the spring forces that are toward each other as indicated by the arrows to the slider 102. That is to say, the directions of the spring forces are substantially perpendicular to the movement direction of the slider, that is, parallel to the horizontal direction as shown in FIG. 9C. The spring forces of the first torsion spring 111 and the second torsion spring 112 offset each other, and the slider 102 is about to enter a second stroke from a first stroke. In this case, there is a spacing between the contact portion 721 and the contact 731, and the switch assembly 105 is in the OFF state. There is a spacing between the trigger lever 722 and the slider 102.

During the movement of the slider from the state as shown in FIG. 9B to the state as shown in FIG. 9C, the operator pushes the door of the appliance to apply a pressure to the slider 102 by means of the latch 801 to overcome the spring forces of the torsion springs 111 and 112, such that the slider 102 moves towards the rear portion 215. During the movement of the slider 102, the locking arm outer section 451 and the locking arm outer section 452 are pressed by the limiting portions 268 and 269 of the housing 101, and the locking ends 431 and 441 move towards each other.

FIG. 9C shows a boundary between the first stroke and the second stroke of the slider 102. During the movement of the slider 102, when the slider passes through the position as shown in FIG. 9C, the directions of the spring forces of the first torsion spring 111 and the second torsion spring 112 in the movement direction of the slider 102 are about to change.

FIG. 9D is a schematic view of the latch 801 further entering between the locking ends 431 and 441 and in the locked state. As shown in FIG. 9D, if the operator further pushes the door of the appliance, the slider 102 continues to move towards the rear portion 215 until the slider reaches the nearest position, i.e., the second position. In this process, the locking arms 103 and 104 are pressed by the limiting portions 268 and 269 of the housing 101, and the locking ends 431 and 441 reach a final position of proximity towards each other, such that the locking arms 103 and 104 are in the locked position. In the locked position of the locking arms 103 and 104, the locking ends 431 and 441 clamp the protrusion 811 of the latch 801 therebetween, and the protrusions 435 and 436 of the locking ends 431 and 441 are located above the protrusion 811, which can prevent the latch 801 from moving upwardly away from the locking ends 431 and 441. In this case, the door of the appliance is locked.

As shown in FIG. 9D, the torsion spring mounting portions 321 and 322 of the slider 102 are at a height in the height direction of the door lock are lower than the positions of the slider elastic device mounting portions 262 and 263 of the housing 101. In this case, the first torsion spring 111 and the second torsion spring 112 apply obliquely downward spring forces that are toward each other as shown by arrows to the slider 102. That is to say, the spring forces have downward force components in the height direction of the door lock, allowing the slider 102 to have a tendency to move downwardly with respect to the housing 101, such that the slider 102 is maintained in the nearest position with respect to the rear portion 215 of the housing 101. That is to say, in this case, the first torsion spring 111 and the second torsion spring 112 allow the locking arms 103 and 104 to maintain in the locked position, such that it is difficult for the locking arms to disengage from the locked position.

During the movement from the state as shown in FIG. 9B to the state as shown in FIG. 9D, the respective smooth sections 453 and 455 of the locking arm outer section 451 and the locking arm outer section 452 are first pressed by the limiting portions 268 and 269 of the housing 101, such that the respective locking ends of the locking arms 103 and 104 are deflected towards each other. The smooth sections 453 and 455 have relatively smooth surfaces, such that the locking arm outer section 451 and the locking arm outer section 452 easily slide with respect to the housing 101. In an embodiment of the present disclosure, when the locking arms 103 and 104 reach the locked position, the slider 102 can further drive the locking arms 103 and 104 to slide with respect to the housing 101 by a certain distance. In this process, the protruding sections 454 and 456 abut against inner sides of the limiting portions 268 and 269 and slide with respect to the limiting portions 268 and 269. The arrangement of the protruding sections 454 and 456 allows for a small contact area between the protruding sections 454 and 456 and the limiting portions 268 and 269, such that the locking arms 103 and 104 easily slide with respect to the housing 101.

In this case, the slider 102 drives the trigger lever 722 to move downwardly to a final position by overcoming the spring force of the spring 712. In this case, the contact portion 721 is in contact with the contact 731, the switch assembly 105 is in a triggered state, and a circuit of the appliance is closed.

When unlocking is needed, the operator pulls the door of the appliance, the latch 801 moves upwardly in the direction as shown in FIG. 9D, the latch 801 drives the locking arms 103 and 104 to move upwardly, and the locking arms 103 and 103 in turn drive the slider 102 to move upwardly. The pulling force applied by the operator to the latch 801 can overcome the spring forces of the first torsion spring 111 and the second torsion spring 112, such that the latch reaches the position as shown in FIG. 9C, and as the operator continues to pull the door of the appliance, the first torsion spring 111 and the second torsion spring 112 apply the obliquely upward spring forces to the slider 102, such that the slider 102 and the locking arms 103 and 104 move upwardly. While the locking arms 103 and 104 are moving upwardly, the locking end 431 of the locking arm 103 and the locking end 441 of the locking arm 104 move in a direction away from each other under the action of the spring force provided by the locking arm return device 113, thus reaching the released position as shown in FIG. 9B. The latch 801 can be disengaged from between the locking arms 103 and 104, such that the door of the appliance can be pulled open. The inventors have noticed that in some door locks, resistance is felt by the operator throughout the closing of the door. In this embodiment, the door lock comprises a housing 101, a slider 102, a pair of locking arms 103 and 104, and a pair of torsion springs 111 and 112, wherein one end of each of the pair of torsion springs 111 and 112 is connected to the slider 102, and the other end thereof is connected to the housing 101, the pair of locking arms 103 and 104 can partially enter the housing 101 and be connected to the slider 102, such that the slider 102 and the pair of locking arms 103 and 104 can move in the housing 101 in the height direction of the door lock. The slider 102 has the first position and the second position. When moving from the first position to the second position, the slider 102 can drive the locking arms 103 and 104 to move, such that the locking arms 103 and 104 move from the released position to the locked position. When the slider 102 moves from the first position to the second position, the ends of the torsion springs 111 and 112 connected to the slider 102 move downwardly, while the positions of the ends thereof connected to the housing 101 remain unchanged, such that angles of the directions of the spring forces generated by the torsion springs 111 and 112 are constantly changing, and the sense of control of the operator can be improved.

When the operator pushes the door of the appliance, the latch 801 on the door of the appliance enters between the pair of locking arms 103 and 104 and can come into contact with the slider 102, thus pushing the slider 102 to move in the first stroke. In this case, the connections between the torsion springs 111 and 112 and the housing 101 are lower than the connections between the torsion springs 111 and 112 and the slider 102, such that the torsion springs 111 and 112 provide the obliquely upward spring forces to the slider 102, that is, provide spring forces in the movement direction of the slider 102, which is opposite to the direction of movement, and the first torsion spring 111 and the second torsion spring 112 apply the spring forces to the slider, which are opposite the movement direction of the latch 801, that is, providing a resistance force to the operator in a first half of the door closing process. When the slider 102 continues to move downwardly and enters the second stroke, the connections between the first torsion spring 111 and the second torsion spring 112 and the slider 102 are lower than the connections between the first torsion spring 111 and the second torsion spring 112 and the housing 101, such that the directions of the spring forces generated by the first torsion spring 111 and the second torsion spring 112 are obliquely downward, thus providing spring forces consistent with the movement direction of the slider 102. That is to say, in the second stroke, the pair of springs can provide an assistance force in the movement direction of the slider 102, the first torsion spring 111 and the second torsion spring 112 apply the spring forces to the slider in the movement direction of the latch 801, that is, providing an assistance force to the operator in a second half of the door closing process. In the first stroke, the operator can experience the resistance of the door when pushing the door, and in the second stroke, the operator can experience the movement of the door toward the body of the appliance, thus providing an attraction feeling to a hand, and a better perception of control in the door closing process. Similarly, in the door opening process, the first torsion spring 111 and the second torsion spring 112 provide the resistance force for the first half of the operation of opening the door opening, and provide the assistance force for the second half of the operation of opening the door, thereby providing the better perception of control in the door opening process. Meanwhile, in this embodiment, the movement of the slider 102 drives the locking arms 103 and 104 to move, and an acting force between the locking arms 103 and 104 is small, which can reduce the requirements on the strength of materials of the locking arms 103 and 104 and prolong the service life of the locking arms 103 and 104.

In this embodiment, the locking arms 103 and 104 can adapt to the shapes of the protrusions 811 of various latches 801 and can adapt to more types of latches.

Figure 10A:
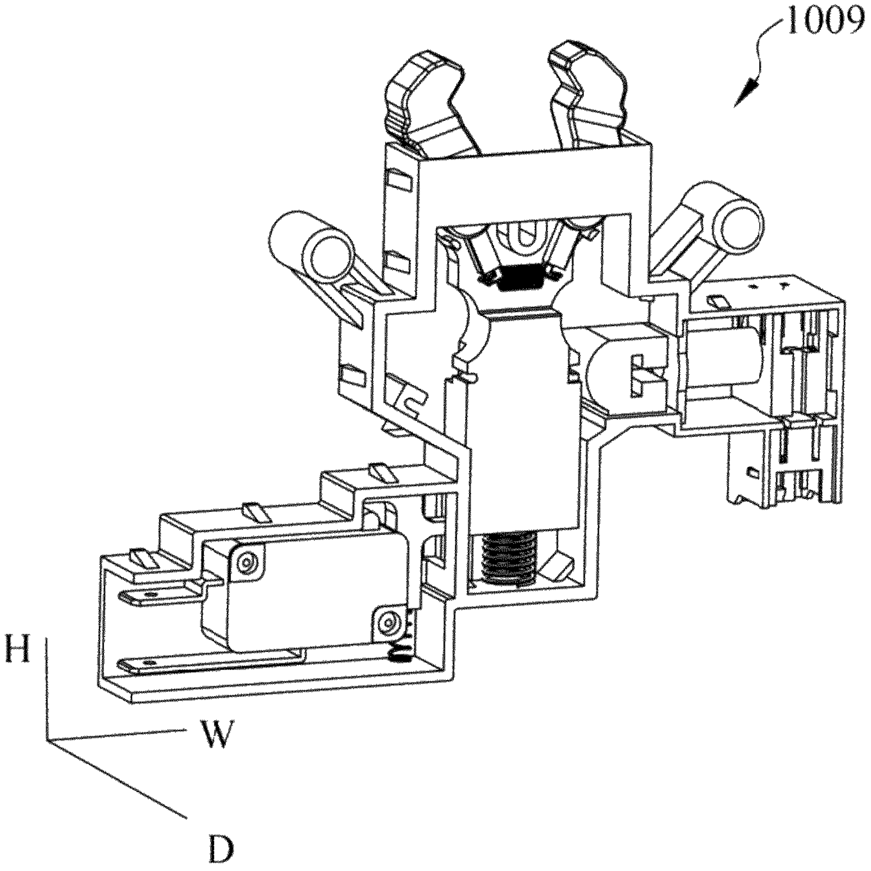
FIG. 10A is a perspective view of a door lock according to a second embodiment of the present disclosure.
Figure 10B:
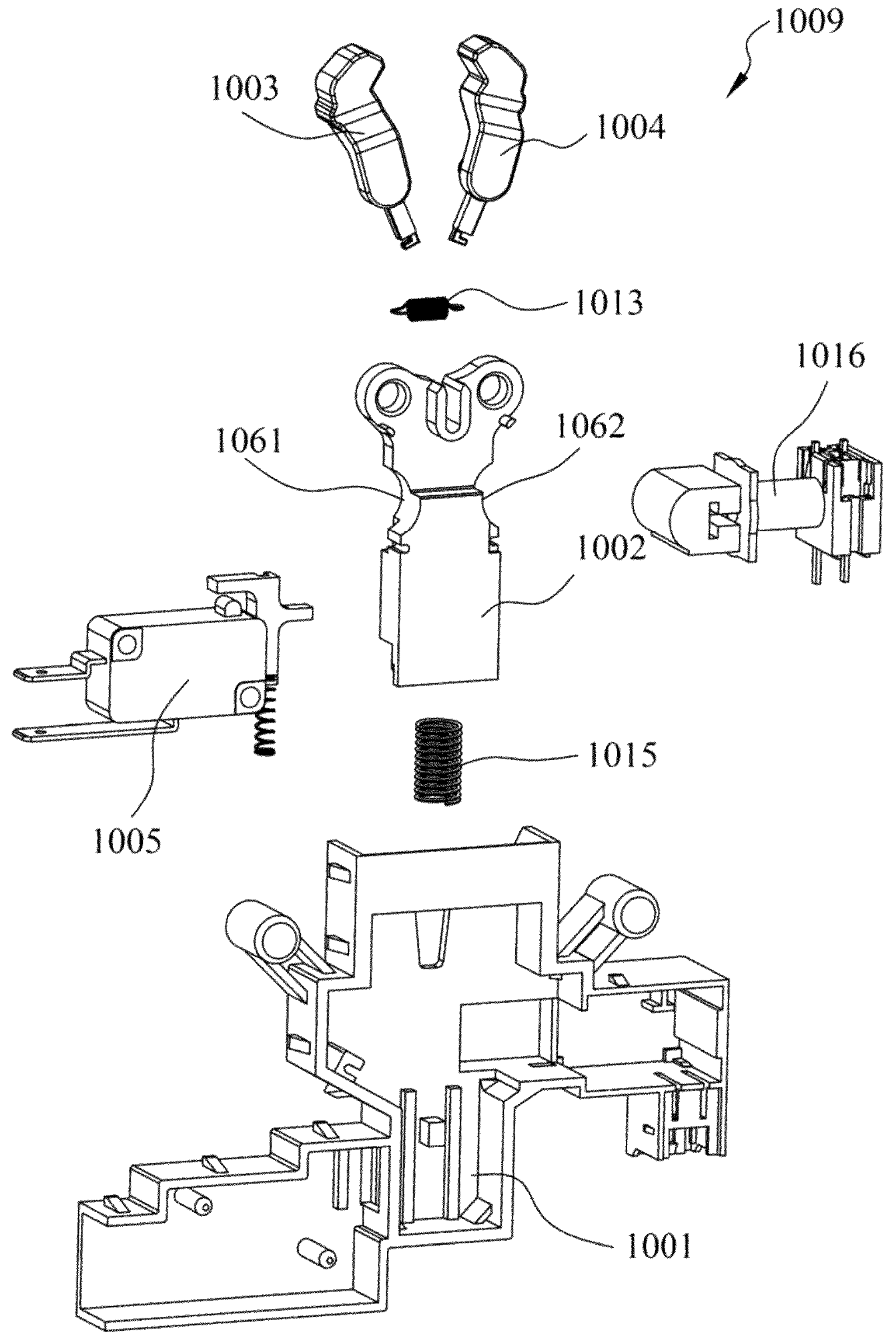
FIG. 10B is an exploded view of the door lock of FIG. 10A.

FIG. 10A is a perspective view of a door lock according to a second embodiment of the present disclosure, and FIG. 10B is an exploded view of the door lock of FIG. 10A. As shown in FIGS. 10A and 10B, similar to the embodiment shown in FIG. 1A, the door lock 1009 has a height direction H, a width direction W and a thickness direction D. The door lock 1009 comprises a housing 1001, a slider 1002, a pair of locking arms 1003 and 1004, a switch assembly 1005 and a locking arm return device 1013. A difference lies in that the door lock 1009 further comprises a slider return device 1015 and a slider locking device 1016. Each of the slider 1002, the switch assembly 1005, the slider return device 1015 and the slider locking device 1016 is accommodated inside the housing 1001.

The slider 1002 has the same structure as the slider 102 of the embodiment in FIG. 1A and comprises a pair of recesses 1061 and 1062 that are recessed towards each other.

In this embodiment, compared with the embodiment shown in FIG. 1A, no slider elastic device 115 is provided, and the door lock is locked and released by means of the slider return device 1015 and the slider locking device 1016.

Figure 11:
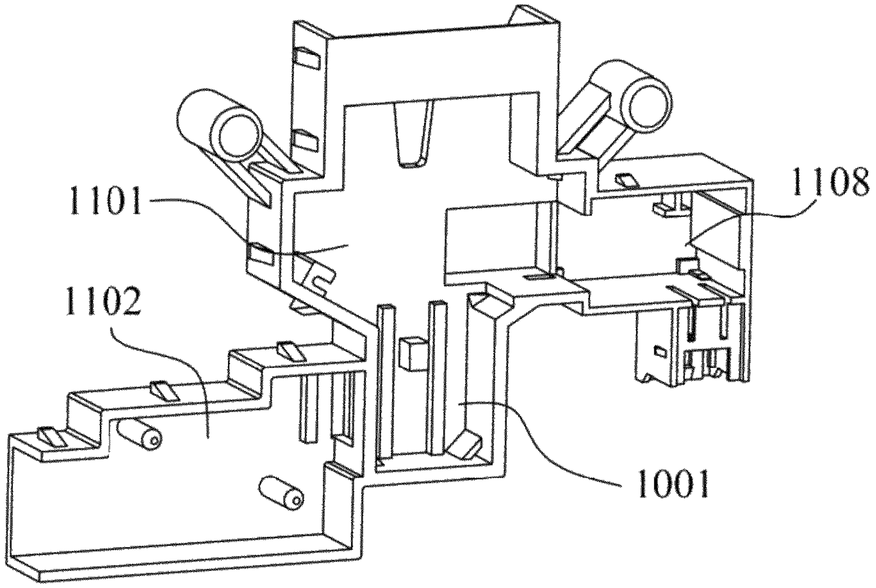
FIG. 11 is a perspective view of a housing of FIG. 10B.

FIG. 11 is a perspective view of the housing of FIG. 10B. As shown in FIG. 11, compared with the housing in the embodiment shown in FIG. 1A, in addition to the body accommodation portion 1101 and the switch accommodation portion 1102, the housing 1001 further comprises a slider locking device accommodation portion 1108 for accommodating the slider locking device 1016. The slider locking device accommodation portion 1108 and the switch accommodation portion 1102 are respectively located on two sides of the body accommodation portion 1101.

Figure 12A:
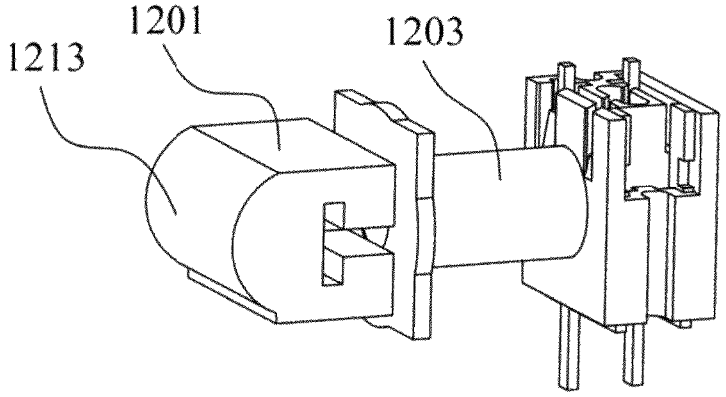
FIG. 12A is a perspective view of a slider locking device of FIG. 10B.
Figure 12B:
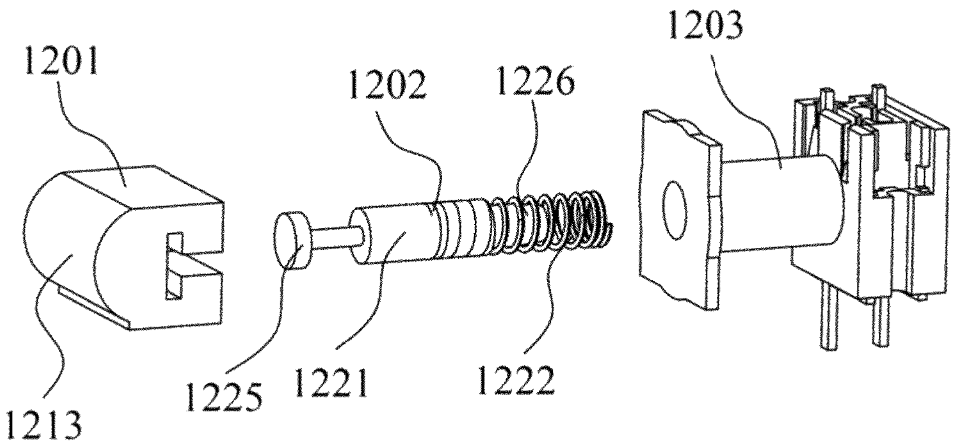
FIG. 12B is an exploded view of the slider locking device of FIG. 12A.

FIG. 12A is a perspective view of the slider locking device of FIG. 10B, and FIG. 12B is an exploded view of the slider locking device of FIG. 12A.

As shown in FIGS. 12A and 12B, the slider locking device 1016 comprises a contact portion 1201, a push rod portion 1202, and a supporting portion 1203. The push rod portion 1202 is mounted in the supporting portion 1203 and connected to the contact portion 1201, and the push rod portion 1202 can move in the supporting portion 1203 to drive the contact portion 1201 to move.

The contact portion 1201 has a circular arc-shaped protrusion 1213, wherein the shape of the circular arc-shaped protrusion 1213 matches the shape of the recess 1062 of the slider 1002 and can enter the recess 1062.

The push rod portion 1202 comprises a connecting rod 1221 and a spring 1222, wherein the connecting rod is connected to the contact portion 1201 at a first end 1225, and the spring 1222 is sleeved on the other end 1226. One end of the spring 1222 abuts against the connecting rod 1221, and the other end abuts against the supporting portion 1203, such that a spring force in the direction of the contact portion 1201 is applied to the connecting rod 1221. The material of the connecting rod 1221 is configured to move in response to a magnetic force of an electromagnetic device.

Figure 13:
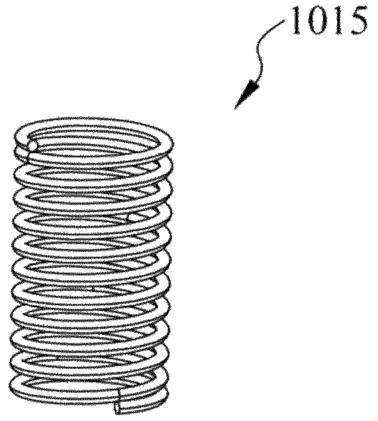
FIG. 13 is a perspective view of a slider return device of FIG. 10B.

FIG. 13 is a perspective view of the slider return device of FIG. 10B. As shown in FIG. 13, the slider return device 1015 is a spring, and the slider return device 1015 is arranged between the slider 1002 and the housing 1001, such that the slider 1002 is provided with a spring force away from the housing 1001 in the height direction.

Figure 14A:
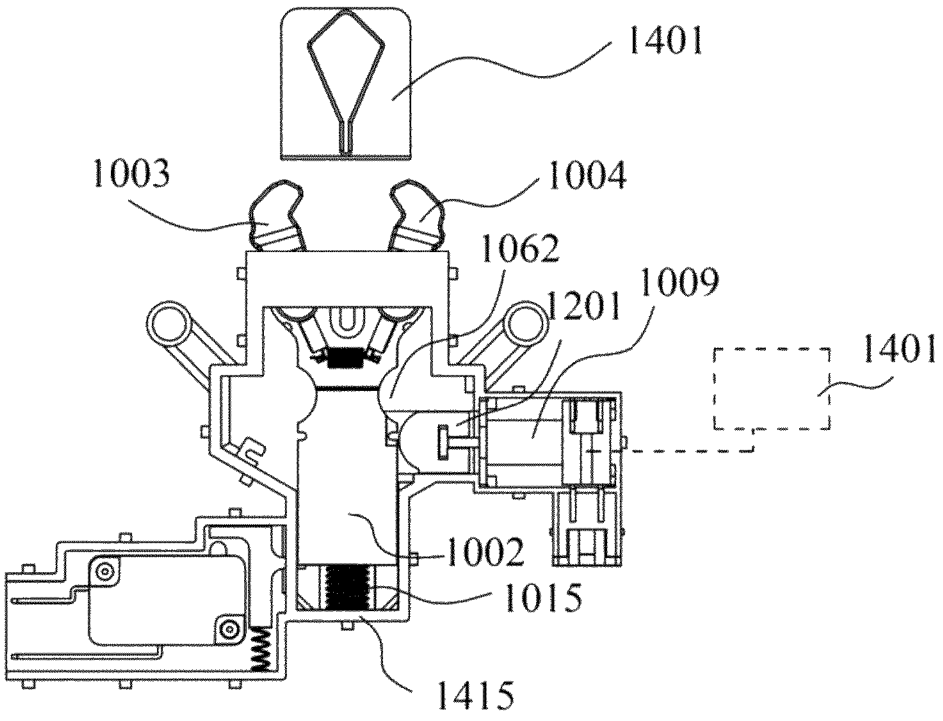
FIG. 14A is a schematic view of the door lock and the latch of FIG. 10A, which are separated from each other.
Figure 14B:
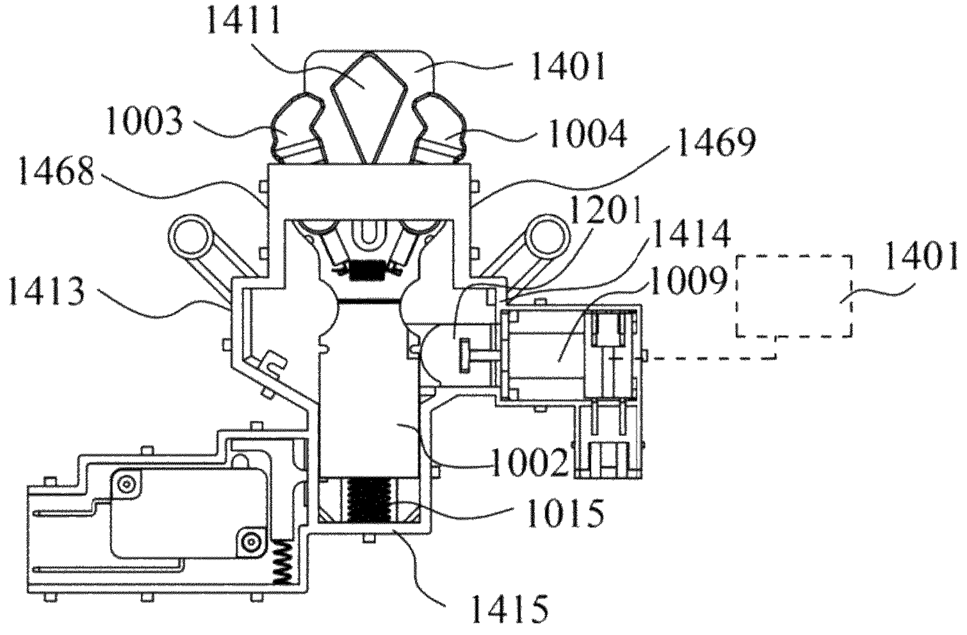
FIG. 14B is a schematic view of the latch that begins to enter the door lock.
Figure 14C:
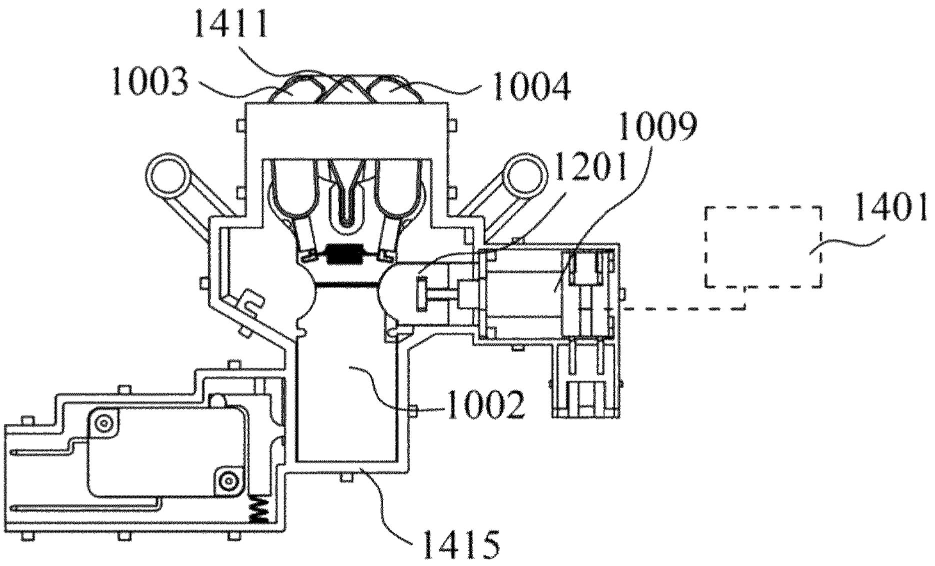
FIG. 14C is a schematic view of the latch in a locked state with respect to the door lock.

FIG. 14A is a schematic view of the door lock and the latch of FIG. 10A, which are disengaged from each other, FIG. 14B is a schematic view of the latch that begins to enter the door lock, and FIG. 14C is a schematic view of the latch in a locked state with respect to the door lock.

As shown in FIG. 14A, similar to the embodiment shown in FIG. 9A, when the door of the appliance is opened, the door and the body of the appliance are in a separated state. In this case, the latch 1401 disengages from the door lock 1009, the locking arms 1002 and 1003 of the door lock 1009 are in a released state. In this case, in the height direction H of the door lock 1009, the slider 1002 is located in the furthest position with respect to the rear portion 1415 of the housing 1001 under the action of the spring force of the slider return device 1015. In the height direction H, the contact portion 1201 of the slider locking device 1009 is misaligned with the recess 1062 of the slider 1002. The contact portion 1201 abuts against a side surface of the slider 1002 and is located below the recess 1062, and the contact portion 1201 is located in a nearest position to the supporting portion 1203. The spring 1222 of the slider locking device 1009 applies a spring force to the contact portion 1201 in the width direction of the door lock and towards the slider 1002.

FIG. 14B shows that the latch 1401 enters between the locking arms 1003 and 1004. In this case, the locking arms 1003 and 1004 remain in the released state, and a protrusion 1411 of the latch 1401 is not yet in contact with the locking arms 1003 and 1004. The latch 1401 is in contact with the slider 1002.

FIG. 14C is a schematic view of the latch 1401 further entering between the locking ends 431 and 441 and in the locked state. As shown in FIG. 14C, if the operator further pushes the door of the appliance, the slider 1002 continues to move towards the rear portion 1415 until the slider reaches the nearest position. In this case, the locking arms 1003 and 1004 are pressed by limiting portions 1468 and 1469 formed by lateral housing portions 1413 and 1414 of the housing 1001, and the respective locking ends of the locking arms 1003 and 1004 continue to move towards each other to reach final positions. The respective locking ends of the locking arms 1003 and 1004 clamp the protrusion 1411 of the latch 1401 therebetween and can prevent the latch 1401 from moving upwardly away from the locking arms 1003 and 1004.

In the position as shown in FIG. 14C, the contact portion 1201 of the slider locking device 1009 is flush with the recess 1062 of the slider 1002 in the height direction of the door lock. The contact portion 1201 moves into the recess 1062, and the contact portion 1201 is located in a position farthest away from the supporting portion 1203. In this case, the contact portion 1201 fits with the recess 1062, such that the slider 1002 cannot move away from the housing 1001 in the height direction H, and the door lock 1009 is maintained in a locked state.

When unlocking is needed, the operator pulls the door of the appliance, the latch 1401 moves upwardly in the direction as shown in 14C, the spring force of the spring 1222 of the slider locking device 1009 allows the contact portion 1201 to move away from the recess 1062, and under the action of the spring force of the slider return device 1015, the locking arms 1003 and 1004 can reach the released position as shown in FIG. 14B, such that the door of the appliance can be pulled open.

In another application of this embodiment, the slider locking device 1009 cooperates with a driving device 1401 for locking and unlocking. In an embodiment of the present disclosure, the driving device 1401 is an electromagnetic switch. When a corresponding electromagnetic switch circuit is closed, the connecting rod 1221 is subjected to an electromagnetic force in a direction opposite the spring force of the spring 1222 of the slider locking device 1009, and the electromagnetic force overcomes the spring force of the spring 1222 of the slider locking device 1009, such that the contact portion 1201 moves away from the recess 1062 to unlock the locking arms 1003 and 1004. In an embodiment of the present disclosure, the driving device 1401 comprises an electric motor.

In another application of this embodiment, the contact portion is configured to have a recess, the slider is configured to have a protrusion, and the slider is unlocked by means of recess-protrusion fit between the contact portion and the slider.

In another application of this embodiment, the slider locking device may be arranged on the slider in a different position, such as on a left side, a front side or a rear side.

The door lock in this embodiment allows for reduced requirements on the strength of the material of the locking arms, and prolonged service life of the locking arms.

In this embodiment, the locking arms of the door lock can adapt to the shapes of the protrusions 811 of various latches 801 and can adapt to more types of latches.

In this embodiment, the door lock can control unlocking of the door lock by means of a switch.

Figure 15:
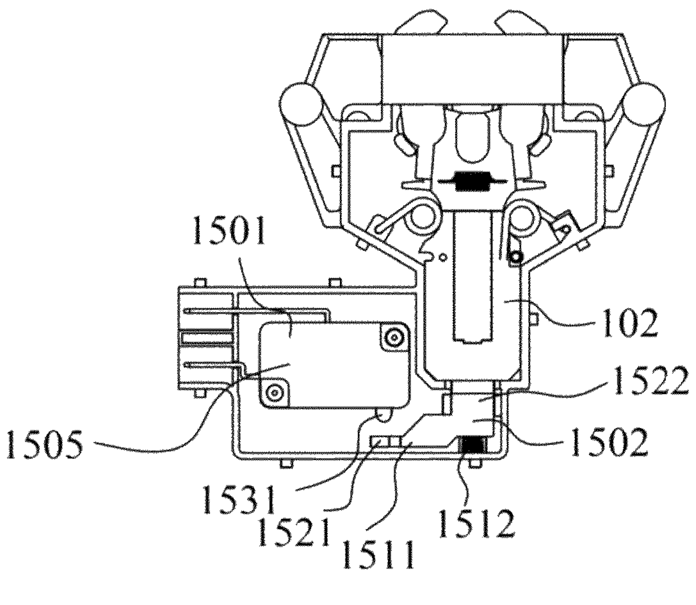
FIG. 15 is a schematic view of a door lock according to a third embodiment of the present disclosure.

FIG. 15 is a schematic view according to a third embodiment of the present disclosure, the embodiment shown in FIG. 15 is similar to the embodiment shown in FIG. 1A, except that the switch assembly 1505 is configured differently from the switch assembly 105 shown in FIG. 1A.

As shown in FIG. 15 and as shown in FIG. 7, the switch assembly 1505 comprises a fixed portion 1501 and a movable portion 1502. The fixed portion 1501 has a contact 1531. The movable portion 1502 has a movable portion 1511 and a spring 1512. The movable portion 1511 has a contact portion 1521 that can come into contact with the contact 1531, and a trigger lever 1522 that can be connected to the slider 102. The slider 102 can drive the trigger lever 1522 to move such that the contact portion 1521 is brought into contact with or separated from the contact 1531. When the contact portion 1521 is in contact with the contact 1531, the switch assembly 1505 is in an OFF state, and when the contact portion 1521 is in contact with the contact 1531, the switch assembly 1505 is in an ON state.

The embodiment shown in FIG. 15 can achieve the same technical effects as the embodiment shown in FIG. 1A.

Although the present disclosure is described with reference to the examples of embodiments outlined above, various alternatives, modifications, variations, improvements and/or substantial equivalents, which are known or anticipated at present or to be anticipated before long, may be obvious to those of at least ordinary skill in the art. Furthermore, the technical effects and/or technical problems described in this description are exemplary rather than limiting; therefore, the disclosure in this specification may be used to solve other technical problems and may have other technical effects. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements and/or substantial equivalents.

The invention claimed is:

1. A door lock, comprising:

a housing;

a locking unit provided within the housing, wherein the locking unit is movable with respect to the housing to assume a locked position and a released position;

a slider connected to the locking unit, wherein the slider is configured to be movable between a first position and a second position, wherein when the slider moves from the first position to the second position, the locking unit is capable of moving from the released position to the locked position;

a slider elastic device, the slider elastic device is configured to provide a spring force to the slider; and a switch assembly transitioning from a first switch state to a second switch state when the slider reaches the second position, the switch assembly including a trigger lever and a contact, the slider configured to push the trigger lever to move into contact with or be separated from the contact, such that the switch assembly switches from one of the first switch state and the second switch state to the other switch state, the switch assembly including an elastic component to apply a spring force to the trigger lever such that the trigger lever leaves the contact.

2. The door lock of claim 1, wherein the direction in which the spring force acts on the slider is changeable during movement of the slider from the first position to the second position.

3. The door lock of claim 2, further comprising:

a first stroke and a second stroke are provided for the slider to move from the first position to the second position, wherein the spring force provides a resistance force to the slider in the first stroke, and the spring force provides an assistance force to the slider in the second stroke.

4. The door lock of claim 3, further comprising:

in the first stroke, a force component of the spring force acting on the slider in a movement direction of the slider is a first force component; and in the second stroke, a force component of the spring force acting on the slider in the movement direction of the slider is a second force component, the first force component and the second force component being in opposite directions.

5. The door lock of claim 4, wherein the slider elastic device comprises a pair of elastic components, wherein the pair of elastic components are respectively connected to two sides of the slider, and each of the pair of elastic components has a first end connected to the housing, and a second end connected to the slider.

6. The door lock of claim 5, wherein during the transition of the slider from the first stroke to the second stroke, a connecting line between a connection between each of the pair of elastic components and the housing and a connection between the pair of elastic components and the slider is substantially perpendicular to the movement direction of the slider.

7. The door lock of claim 6, wherein the pair of elastic components are torsion springs or springs.

8. The door lock of claim 1, wherein the locking unit comprises a pair of locking arms, wherein each of the pair of locking arms comprises locking ends being movable toward or away from each other to allow the pair of locking arms to reach the locked position and the released position.

9. The door lock of claim 8, wherein the pair of locking arms are capable of retaining a locked component between the pair of locking arms, and the locking ends of the pair of locking arms are configured to be able to prevent the locked component from being disengaged from the pair of locking arms.

10. The door lock of claim 9, wherein the locking ends of the pair of locking arms comprise a pair of protrusions bent toward each other, wherein when the pair of locking arms are in the locked position, the pair of protrusions are located on one side of the locked component in the movement direction of the slider so as to prevent the locked component from moving toward the locking ends in the movement direction of the slider.

11. The door lock of claim 10, wherein the pair of locking arms each comprise a connecting end rotatably or slidably connected to the slider; and the door lock further comprises locking arm return devices being respectively connected to the pair of locking arms and capable of applying spring forces to the pair of locking arms to maintain the pair of locking arms in the released position.

12. The door lock of claim 8, wherein the housing has a pair of limiting portions, wherein the pair of locking arms each has a locking arm outer section, and when the slider moves from the first position to the second position, the locking arm outer sections of the pair of locking arms are pressed by the pair of limiting portions such that the pair of locking arms moves from the released position to the locked position.

13. A door lock assembly, comprising:

a door lock of claim 1; and a latch comprising a protrusion being capable of entering between the pair of locking arms and configured to be locked by the pair of locking arms to limit a movement of the latch with respect to the door lock.

14. An appliance, comprising:

a door lock assembly of claim 13.

15. The door lock of claim 1 further comprising:

a slider locking device configured to retain the slider in the second position and to retain the locking unit in the locked position.

16. The door lock of claim 15, wherein the slider locking device is configured to engage with and disengage from the slider, wherein when the slider locking device is engaged to the slider, the slider is maintained in the second position and the locking unit is maintained in the locked position, and when the slider locking device is disengaged from the slider, the slider moves out of the second position, and thus the locking unit moves out of the locked position.

17. The door lock of claim 16, wherein the slider locking device further comprises a driving device capable of driving the slider locking device away from the slider, such that the slider is capable of moving from the second position to the first position.

18. The door lock of claim 16, wherein the slider locking device further comprises a contact portion capable of moving to engage with the slider or disengage from the slider and a contact portion elastic device being configured to provide a spring force to the contact portion such that the contact portion is moveable toward the slider; and one of the contact portion and the slider comprises a protrusion, and the other of the contact portion and the slider comprises a recess, wherein when the slider locking device is engaged to the slider, the protrusion enters the recess, and when the slider locking device is disengaged from the slider, the protrusion exits the recess.

* * * * *